C. DITTMAN.
Nut-Locks.
No. 144,964. Patented Nov. 25, 1873.
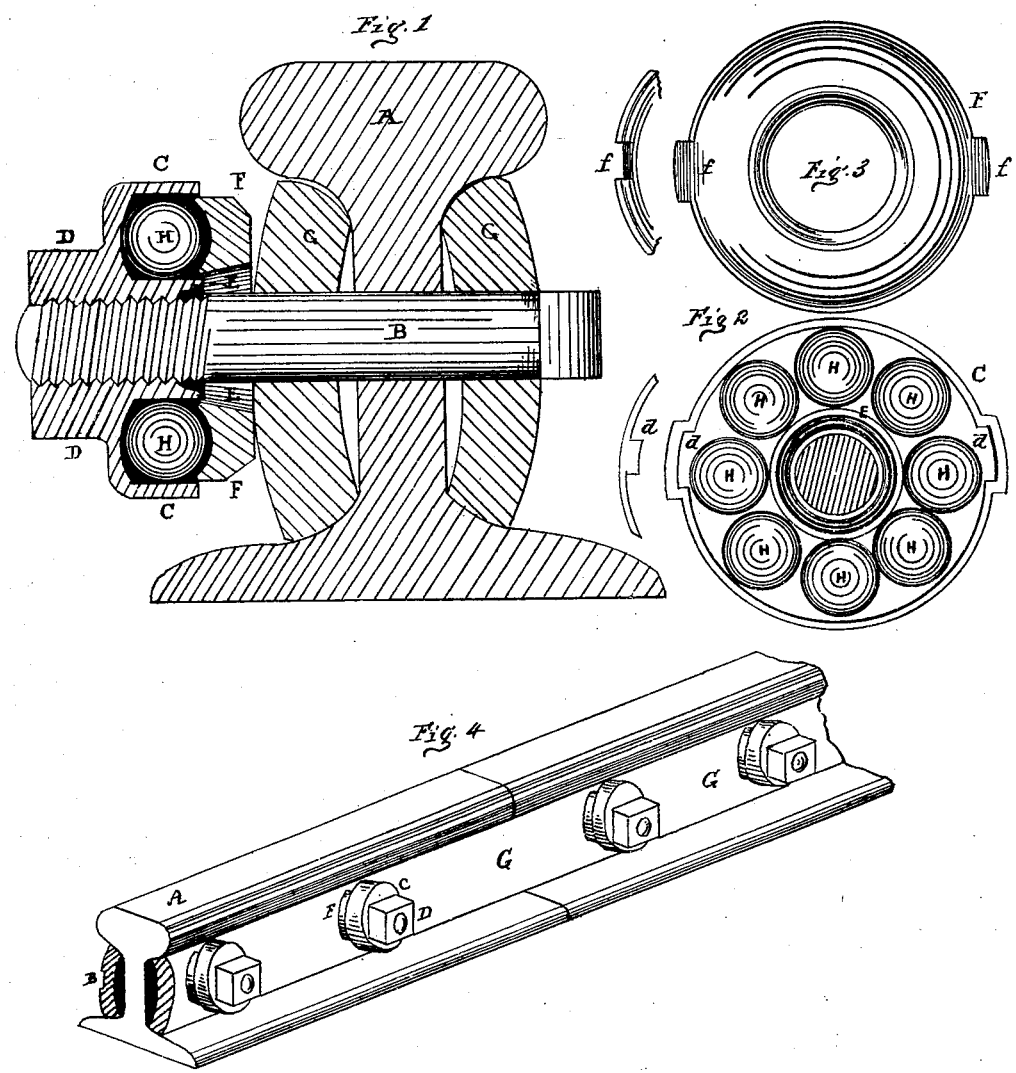

UNITED STATES PATENT OFFICE.

CASPER DITTMAN, OF NEAR LEACOCK POST OFFICE, PENNSYLVANIA, ASSIGNOR TO HIMSELF AND DAVID N. LANDIS, JR., OF SAME PLACE.

IMPROVEMENT IN NUT-LOCKS.

Specification forming part of Letters Patent No. 144,964, dated November 25, 1873; application filed July 10, 1873.

*To all whom it may concern:*

Be it known that I, CASPER DITTMAN, of Leacock, in the county of Lancaster and State of Pennsylvania, have invented a new and Improved Nut-Lock; and I do hereby declare that the following is a full, clear, and exact description of the same, reference being had to the accompanying drawing, forming a part of this specification.

The invention relates to that class of nut-locks which, by some elastic substance, take up the longitudinal expansion of the bolt, (which expansion causes the nut to work loose under jars and shaking motions,) and provide, at the same time, for a corresponding contraction.

The invention will first be fully described, and then clearly pointed out in the claims.

Figure 1 is a sectional view of my invention applied to a railroad fish-plate; Fig. 2, the balls, preferably used by me as they are arranged in their chamber; Fig. 3, a perspective view of the subject-matter illustrated in Fig. 1.

A is a railroad-rail, provided with fish-plates G G, which are held by the usual bolts B. D is my improved nut, in which is formed, between the two flanges C E, a chamber provided with inside radial projections, which fit into corresponding notches in a washer, F, or the reverse. These notches and projections *d f* serve to lock together the nut, so far as rotary motion is concerned, and to compel them to turn together, or not at all. The washer has, preferably, a concavity transversely curved, so as to receive rubber balls H, and bring as large a portion as possible of the balls into contact with the washer.

When the nut and washer are screwed up the balls spread, as the flanges C E continue to increase their overlap of the washer F, until, finally, they fill nearly, if not entirely, the whole hollow space left between the flanges C E.

If the bolt B becomes elongated by expansion, the balls take up that expansion as fast as it occurs by their own, thus affording the nut no opportunity to work loose.

This principle of action is well understood, and elastic washers have been heretofore applied for the same purpose; but the principle is believed never to have been carried out by means like mine.

In order to offer this device to the public in a form which will prevent the accidental separation of the parts, or the loss of one from the other, I upset the tubular inner end of the nut in the hole of the washer. This will retain the parts together, and admit of much handling without separation.

Having thus described my invention, what I claim as new, and desire to secure by Letters Patent, is—

1. The combination of nut D having flanges C E, and the rubber balls H placed between said flanges and the washer F, substantially as and for the purpose described.

2. A nut and washer C D E F, held together by a portion of the nut being upset in the hole of the washer, as and for the purpose specified.

CASPER DITTMAN.

Witnesses:
W. B. WILEY,
H. C. WEIDLER.